Patented June 16, 1931

1,810,170

UNITED STATES PATENT OFFICE

IVAN GUBELMANN AND CLYDE O. HENKE, OF SOUTH MILWAUKEE, WISCONSIN, ASSIGNORS TO THE NEWPORT COMPANY, OF CARROLLVILLE, WISCONSIN, A CORPORATION OF DELAWARE

PROCESS OF PURIFYING AND DECOLORIZING ROSINS WITH RESORCINOL

No Drawing.   Application filed July 25, 1927.   Serial No. 208,407.

This invention relates to a process of purifying and decolorizing rosin containing material by means of resorcinol.

It has been proposed in the art to purify rosin by treating a solution of the same with selective solvents which are capable of extracting the impurities and coloring matters from the rosin. The selective solvents containing the impurities are then removed from the rosin solution and the rosin is recovered from the purified solution. Among other selective solvents phenol ($C_6H_5OH$) has been proposed.

The present invention constitutes certain improvements over the said process, in that we have found that resorcinol possesses many advantages from a practical standpoint over other phenolic solvents and lends itself readily to a modification of present rosin extraction methods.

It is therefore an object of this invention to provide an improved method of purifying and decolorizing rosins by means of resorcinol wherein low grade rosins may be converted to high grade rosins by the simple adaptation of present known commercial methods for the extraction of commercial rosins.

It is a further object of this invention to provide a method of purifying and decolorizing rosins by means of resorcinol, and to provide a simple method for recovering the resorcinol for re-use in subsequent operations.

Other and further important objects of this invention will be apparent from the disclosures in the specification and the appended claims.

Resorcinol has a selective solvent action toward the impurities and coloring matters normally contained in wood and gum rosins.

We have now found that resorcinol has certain other properties which render its application to the purifying of rosin more advantageous than the use of other phenolic bodies, such as phenol. Resorcinol has a very low solubility in the common rosin solvents and it further has the convenient property of solidifying at ordinary temperatures, both of which properties can be taken advantage of by our improved method of purifying and decolorizing rosin.

In general, our process comprises dissolving the rosin in a suitable solvent therefor, and in treating the rosin solution thus formed with a relatively small quantity of resorcinol to extract rosin impurities and coloring matters. As is well known, wood rosins are prepared by extracting finely comminuted resinous woods with various solvents, of which some of the better known are petroleum, naphtha, gasoline, turpentine and other cyclic and aliphatic hydrocarbons. Practically any of these solvents may be used in our process provided that the solvent used is relatively immiscible with resorcinol at low and ordinary temperatures.

After the resorcinol has been added to the rosin solution, the mass is preferably heated to an elevated temperature, that is, around the boiling temperature of the rosin solvent, and efficiently agitated until the extraction of the impurities and coloring matter by the resorcinol has been largely effected. The mass is then cooled to a temperature at which the resorcinol solidifies. Ordinarily, the resorcinol containing the impurities and coloring matter present in the original rosin solidifies to a crust which adheres to the extraction apparatus, some of the resorcinol also being precipitated to the bottom of the apparatus. The solution of purified rosin may then be drawn off completely by decantation without the difficulties usually attendant in making a separation between two liquid layers. The purified rosin is recovered from its solution by ordinary or steam distillation.

The small amount of resorcinol which is contained in the rosin solvent solution can be extracted quantitatively with water, due to the very high water solubility of resorcinol and to the very low solubility of resorcinol in common rosin solvents. The recovery of the resorcinol from this water solution will be described hereinafter.

The solid mass of resorcinol and extracted rosin impurities and coloring matter remaining in the extraction apparatus after the above separation may also be treated with water and the resorcinol extracted in this manner. The impure and colored rosin extract forms a soft pitch at elevated temperatures, so that it can be easily separated from the water solution of resorcinol. By evaporating the combined water solutions of resorcinol, the resorcinol can be completely recovered.

Although the purification of prepared rosins can be effected by our method as described above, we have found quite unexpectedly that our process is remarkably efficient when used in connection with a commercial solution of rosin, pine oil and other terpenes in a rosin solvent, as the solution is ordinarily obtained in the production of rosin from resinous woods by present extractive methods.

Without limiting our invention to any particular procedure, the following example, in which parts by weight are expressed, illustrates an embodiment of our preferred method:

To a solution of 2,000 parts of rosin extract, as it is commonly secured in the production of wood rosin by extraction of resinous woods with petroleum naphtha, are added 50 parts of resorcinol and the resulting mixture heated to boiling with efficient agitation. Without prolonged treatment, the mixture is then cooled to ordinary or low temperatures, say 15° C. with thorough stirring. There results a solution of purified rosin and a precipitated solid mass, from which the rosin solution may be easily decanted. The so decanted solution contains, in addition to the purified rosin, a small amount of dissolved resorcinol, which is then extracted with water. The precipitated solid mass contains most of the resorcinol, which is treated in the extraction apparatus by boiling with water, by which method the resorcinol is practically completely extracted. The water solution of the resorcinol is decanted from the residual coloring matter and combined with the above mentioned water solution of resorcinol. The combined resorcinol water solutions are evaporated to dryness in a still, leaving solid resorcinol in the bottom of the still suitable for re-use in subsequent operations. The rosin is recovered from the solvent solution in a highly purified form by the usual method.

According to the above method, either wood rosin or gum rosin may be greatly improved in grade, and inferior grades of rosin sufficiently purified for use in manufacturing processes requiring the highest grades of rosin. It should be noted that our method requires relatively smaller quantities of resorcinol than where phenol is used as the selected solvent for the rosin impurities and coloring matter. It should also be noted that where it is often desirable and necessary to make more than one extract when phenol is used as the selective solvent, according to our method, fewer extracts give highly satisfactory results.

We are aware that many changes may be made and numerous details of the process may be varied through a wide range without departing from the principles of this invention, and we, therefore, do not purpose limiting the patent granted hereon, otherwise than necessitated by the prior art.

We claim as our invention:

1. In the process of purifying and decolorizing rosins, the steps which comprise treating a rosin dissolved in a common rosin solvent with resorcinol at an elevated temperature, said solvent being relatively immiscible with resorcinol at low and ordinary temperatures, and cooling to precipitate the resorcinol containing dissolved impurities and coloring matter.

2. In the process of purifying and decolorizing rosins, the steps which comprise treating a solvent extraction mass from resinous wood containing rosin, pine oil and other terpenes and a relatively volatile liquid hydrocarbon immiscible at low temperatures with resorcinol, with resorcinol at an elevated temperature and cooling to precipitate the resorcinol containing dissolved impurities and coloring matter.

3. In the process of purifying and decolorizing rosins, the steps which comprise treating a rosin dissolved in a relatively volatile liquid hydrocarbon immiscible with resorcinol at low and ordinary temperatures, with resorcinol at an elevated temperature, cooling to precipitate the resorcinol containing dissolved impurities and coloring matter and separating the rosin solution from the precipitated resorcinol mass by decantation.

4. In the process of purifying and decolorizing rosins, the steps which comprise treating a solvent extraction mass from resinous wood containing rosin, pine oil and other terpenes and a relatively volatile liquid hydrocarbon immiscible with resorcinol at low and ordinary temperatures, with resorcinol at an elevated temperature, cooling to precipitate the resorcinol containing dissolved impurities and coloring matter and separating the rosin solution from the precipitated resorcinol mass by decantation.

5. In the process of purifying and decolorizing rosin, the steps which comprise dissolving the rosin in petroleum naphtha, adding thereto resorcinol, heating the resulting mixture substantially to the boiling point under agitation, cooling to a temperature at which the resorcinol will separate out as a preciptate containing dissolved impurities and coloring matter and separating the rosin solution from the resorcinol precipitate.

6. The process of purifying and decolorizing rosin, which comprises treating a commercial solvent extraction mass from resinous wood containing rosin, pine oil and other terpenes and a light petroleum distillate with a relatively small quantity of resorcinol, heating the treated mass to substantially boiling temperature under agitation, cooling until the resorcinol separates out as a preciptate or crust containing dissolved rosin impurities and coloring matters, separating the rosin solution from the precipitated resorcinol and recovering the purified and decolorized rosin from said rosin solution.

7. The process of purifying and decolorizing rosin, which comprises treating a petroleum naphtha extraction mass from resinous wood, containing rosin, pine oil and other terpenes with a relatively small quantity of resorcinol, heating the treated mass to substantially boiling temperature under agitation, cooling until the resorcinol separates out as a precipitate or crust containing dissolved rosin impurities and coloring matters, separating the rosin solution from the precipitated resorcinol and recovering the purified and decolorized rosin from said rosin solution.

8. In the process of purifying and decolorizing rosins, the steps which comprise heating a rosin dissolved in a volatile liquid hydrocarbon with resorcinol.

9. In the process of purifying and decolorizing rosins, the step of treating rosin in solution with resorcinol to form a preciptate of resorcinol containing dissolved rosin impurities and coloring matter and recovering the rosin solution from said preciptate.

In testimony whereof, we have hereunto subscribed our names.

IVAN GUBELMANN.
CLYDE O. HENKE.